(12) United States Patent
Krawiec et al.

(10) Patent No.: US 6,225,003 B1
(45) Date of Patent: May 1, 2001

(54) ELECTRODE MATERIALS HAVING AN ELASTOMER BINDER AND ASSOCIATED ELECTROCHEMICAL AND FABRICATION PROCESS

(75) Inventors: Wlodek T. Krawiec, Woburn; Denis G. Fauteux, Acton; Martin Van Buren, Chelmsford, all of MA (US)

(73) Assignee: Mitsubishi Chemical Corporation (JP)

( * ) Notice: Subject to any disclaimer, the term of this patent is extended or adjusted under 35 U.S.C. 154(b) by 0 days.

(21) Appl. No.: 09/178,844

(22) Filed: Oct. 26, 1998

(51) Int. Cl.$^7$ ........................................ H01M 4/62
(52) U.S. Cl. ............................ 429/217; 429/233
(58) Field of Search ....................... 429/217, 233

(56) References Cited

U.S. PATENT DOCUMENTS

| | | | |
|---|---|---|---|
| 4,814,242 | 3/1989 | Maxfield et al. | 429/217 |
| 5,162,170 | * 11/1992 | Miyabayashi et al. | 429/94 |
| 5,262,255 | 11/1993 | Ito et al. | 429/217 |
| 5,378,560 | 1/1995 | Tomiyama | 429/217 |
| 5,436,093 | * 7/1995 | Huang et al. | 429/217 |

FOREIGN PATENT DOCUMENTS

| | | |
|---|---|---|
| 0 762 525 A1 | 3/1997 | (EP) . |
| 3-53451 | * 3/1991 | (JP) . |
| 5-21068 | 1/1993 | (JP) . |
| 6-215761 | 8/1994 | (JP) . |
| 8-250122 | 9/1996 | (JP) . |
| 8-250380 | 9/1996 | (JP) . |
| 8-306391 | 11/1996 | (JP) . |
| 9-45332 | 2/1997 | (JP) . |
| 9-45333 | 2/1997 | (JP) . |
| 9-63590 | 3/1997 | (JP) . |
| 9-87571 | 3/1997 | (JP) . |
| 9-92288 | 4/1997 | (JP) . |
| 9-147834 | 6/1997 | (JP) . |
| 9-199135 | 7/1997 | (JP) . |

OTHER PUBLICATIONS

Y. Nakagawa et al., Study on Irreversible Capacity Loss in Lithium Ion Rechargeable Batteries, 1997, pp. 1343–1344.
T.D. Tran et al., Commercial Carbonaceous Materials as Lithium Intercalation Anodes Oct., 1995, pp. 3297–3302.
S.P.S. Yen et al., Elastomeric Binders for Electrodes, May 1983, pp. 1107–1109.
T. Hara et al., New Binding Materials for Metal Hydride Electrodes which Permit Good Recycleability, Sep. 1993, pp. 2450–2454.

* cited by examiner

*Primary Examiner*—Laura Weiner
(74) *Attorney, Agent, or Firm*—Factor & Partners

(57) ABSTRACT

An electrode for use in an electrochemical cell comprising a current collecting substrate, an electrode active material cluster having at least one particle wherein the particle includes at least one inclusion, an elastomer binder surrounding at least a portion of the at least one particle, and means associated with the elastomer binder for precluding mechanical degradation of the electrode active material cluster and, in turn, loss of electrical continuity between the at least one particle therein.

16 Claims, 2 Drawing Sheets

ELECTRODE MATERIALS HAVING AN ELASTOMER BINDER AND ASSOCIATED ELECTROCHEMICAL AND FABRICATION PROCESS

BACKGROUND OF THE INVENTION

1. Field of the Invention

The present invention relates in general to electrode materials, and more particularly, to electrode material clusters having an elastomer binder which increases, among other things, electrical conductivity and adhesion of the electrode material clusters to the current collector, as well as enhances mechanical properties. The present invention is further directed to an electrochemical process and a process for fabricating an electrode having such components.

2. Background Art

Lithium ion electrochemical cells have been known in the art for several years. Furthermore, lithium ion batteries having electrode active materials which are mixed with binders are likewise well known. Such binders have been used to deter a phenomenon known as "falling out" of active material. "Falling out" of active material commonly results in a loss of particle-to-particle contact between active material particles which, in turn, adversely affects the electrochemical performance of the cell. At least one contributing factor which hastens the "falling out" of active material is the physical characteristics of the binder materials. In particular, prior art electrodes utilize binders which are rigid, or non-malleable after curing. Binders having such rigidity remain especially problematic for secondary cells designed for extensive cycling—where ions intercalate and deintercalate repeatedly.

In an attempt to remedy the above-identified problems, the prior art introduced additional quantities of binder into the electrochemical cell. Unfortunately, when additional binder is introduced into the cell a considerable rise in internal resistivity is observed which adversely affects the cell's capacity and electrochemical performance.

SUMMARY OF THE INVENTION

The present invention is directed to an electrode for use in an electrochemical cell comprising a current collecting substrate, an electrode active material cluster having at least one particle wherein the particle includes at least one inclusion, an elastomer binder surrounding at least a portion of the at least one particle and means associated with the elastomer binder for precluding mechanical degradation of the electrode active material cluster and, in turn, loss of electrical continuity between the at least one particle therein.

In a preferred embodiment the degradation preclusion means comprises the at least one particle having a volumetric variation which is less than the maximum elasticity of the associated elastomer binder. In this embodiment, the elastomer binder comprises a non-fluorinated compound having non-conjugated double bonds and a cross linking agent. In particular, the elastomer binder is preferably selected from at least one of the group of polymers and copolymers of ethylene, butylene, butadiene, isoprene, styrene, chloroprene, siloxane, and nitrite rubbers and the crosslinking agent is preferably butadiene sulfone.

In another embodiment of the invention the concentration of the butadiene sulfone ranges from about 1 wt. % to about 10 wt. % of the overall elastomer binder.

The present invention is further directed to an electrochemical cell generally comprising an electrolyte, a first electrode, and a second electrode wherein at least one of the first and second electrodes includes a current collecting substrate, an electrode active material cluster having at least one particle wherein the particle includes at least one inclusion, an elastomer binder surrounding at least a portion of the at least one particle and means associated with the elastomer binder for precluding mechanical degradation of the electrode active material cluster and, in turn, loss of electrical continuity between the at least one particle therein.

In this preferred embodiment, the degradation preclusion means comprises the at least one particle having a volumetric variation which is less than the maximum elasticity of the associated elastomer binder. In this embodiment the elastomer binder comprises a non-fluorinated compound having non-conjugated double bonds and a cross linking agent.

The present invention is also directed to a process for fabricating an electrochemical cell comprising the steps of: a) synthesizing a first electrode active material cluster having at least one particle wherein the particle includes at least one inclusion; b) synthesizing an elastomer binder; c) mixing the electrode active material cluster with the elastomer binder to, in turn, create a first electrode paste; d) applying the first electrode paste to a current collecting substrate; e) curing the first electrode paste; f) associating an electrolyte with the first electrode paste; and g) associating a second electrode adjacent the electrolyte.

In another preferred embodiment of the process, the step of synthesizing the elastomer binder includes the step of preparing the binder to have a maximum elasticity greater than the volumetric variation of the at least one particle. In this process the step of preparing the elastomer binder includes the step of mixing a non-fluorinated polymer having non-conjugated double bonds with a cross linking agent.

In other embodiments of the invention the process further includes the steps of drying the solvent/coating fluid of the electrode paste before the step of curing the electrode paste as well as the step of compressing the electrode paste after the step of curing the electrode paste.

In yet another preferred embodiment, the step of curing the electrode paste includes heating the electrode pate in at least one atmosphere selected from the group of argon, nitrogen, oxygen, carbon dioxide, ammonia, and mixtures thereof.

The present invention is also directed to an electrochemical process associated with an electrochemical cell comprising the steps of: a) applying an electrical charge to an electrochemical cell having an anode, a cathode, and an electrolyte wherein the anode includes an active material cluster having particles with at least one inclusion and an elastomer binder surrounding at least a portion of each of the particles, wherein each of the particles has at least a portion in contact with the associated clastomer binder, and each of the particles are conductively associated with another particle; b) intercalating metal ions into the inclusions within the associated particles; and c) maintaining continuity between the elastomer binder and the associated particles during and after the step of intercalating.

In a preferred embodiment of the invention, the process further includes the steps of: a) deintercalating the previously intercalated ions out of the inclusions; and b) maintaining continuity between the elastomer binder and the associated particles during and after the step of deintercalating.

BRIEF DESCRIPTION OF THE DRAWINGS

The invention will now be described with reference to the drawings wherein.

DETAILED DESCRIPTION OF THE DRAWINGS

Figure 1:
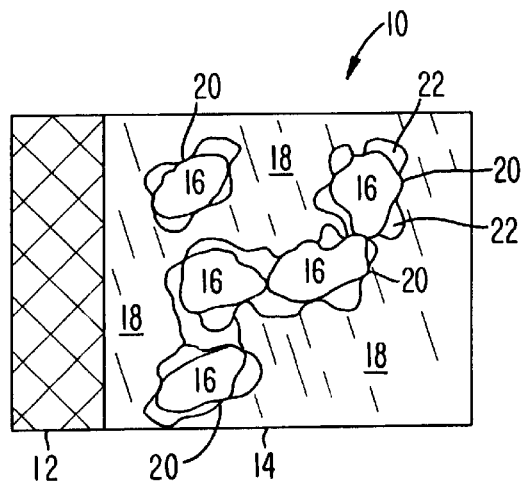
FIG. 1 of the drawings is a schematic representation of the prior art electrode before an initial charge.

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated.

Prior art electrode 10 is shown in FIG. 1, prior to an initial charge, as including current collector 12 and paste layer, or electrode paste layer (hereinafter "electrode layer") 14. Electrode layer 14 comprises a plurality of multi-component particles 16 and binder material 18. Typically, each multi-component particle 16 is greater than one micron in diameter and includes an electronically active component capable of accepting and releasing one or more inclusion particles, such as metallic ions. Binder material 18, such as PTFE or PVDF, at least partially surrounds the electrically active components 16. Each of the plurality of multi-component particles 16 are in contact with the binder 18 at various contact points 20.

Figure 2:
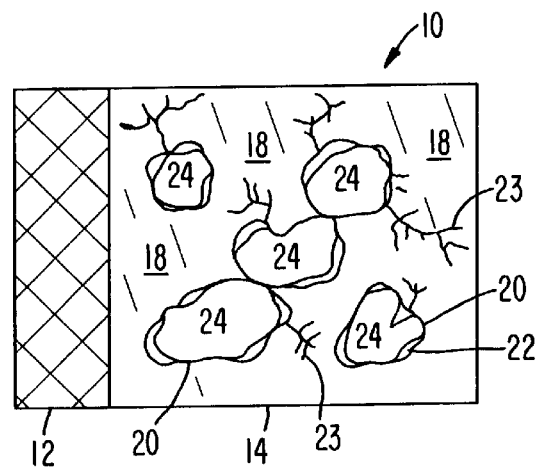
FIG. 2 of the drawings is a schematic representation of the prior art electrode after an initial charge.
Figure 3:
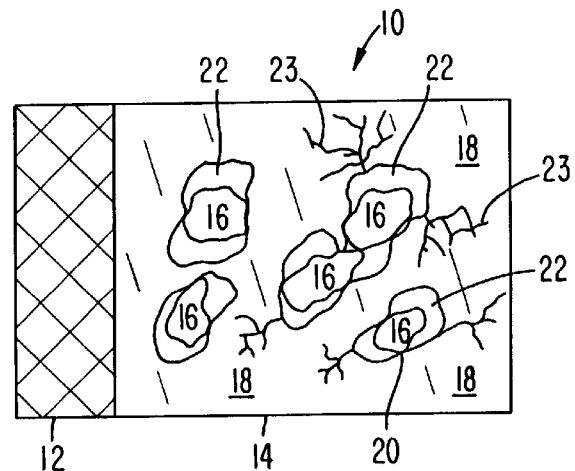
FIG. 3 of the drawings is a schematic representation of the prior art electrode after an initial discharge.

Prior art electrode 10 is shown in FIG. 2, after an initial charge cycle, as including current collector 12 and electrode layer 14. Electrode layer 14 now includes volumetrically expanded multi-component particles comprising a plurality of outer components 25 and one or more inclusion particles 26 surrounded, in part, by binder material 18. As will be understood, the inclusion particles, such as lithium ions, will intercalate/occlude within the outer components, and then deintercalate/deocclude during the discharge cycle. As explained in co-pending application Ser. No. 08/954,144, from which the present application depends (the entirety of which is incorporated herein by reference), the volume within the outer components actually expand and contract during the intercalation—deintercalation process—regardless of magnitude. Unfortunately, during cycling of the electrochemical cell (which utilizes such a prior art electrode), the volume changes of the multi-component particles 24, after intercalation, actually expand greater than the elasticity of the partially surrounding binder material 18. As a result, such expansion actually causes the associated binder material to "break down" or degrade at points 23, whereby such degradation not only results in a loss of electrical continuity between the particles, but it also results in electrolyte migration and decomposition on the multi-component particles 24. Furthermore, upon deintercalation of the ions (lithium) from particles 24, the volume size of the active component may actually decrease (as shown in FIG. 3). Accordingly, there is a substantial loss of continuity and adhesion between the electrode active component 16 and degraded binder material 18.

Figure 4:
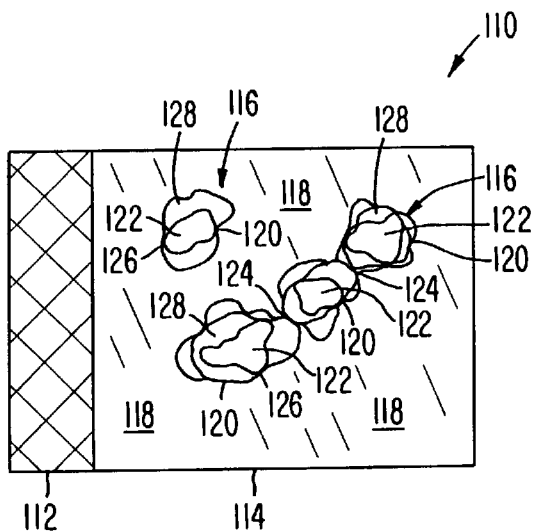
FIG. 4 of the drawings is a schematic representation of an electrode of the present invention before an initial charge.

Electrode 110 of the present invention, is shown in FIG. 4 prior to an initial charge, as including current collector 112 and electrode layer 114. As will be understood to those having ordinary skill in the art, the electrode will comprise an anode, and current collector 112 may comprise any one of a number of conventional materials. Electrode layer 114 comprises a plurality of multi-component particles 116 and an elastomer binder material 118. Each multi-component particle 116 includes a particle 120 having at least one inclusion 122. Multi-component particles 116 are preferably fabricated from carbonaceous materials. However, any one of a number of materials are likewise suitable for use so long as the material is compatible with the remainder of the electrochemical cell. While inclusions 122 may be used in various sizes, it has been observed that inclusions less than one micron are preferable. As can be seen, each of the particles 120 are in contact with each other at various contact points 124, and, each inclusion has points of contact 126 with the associated carbon particles. Electrode layer 114 further includes voids 128 which enable expansion of multi-component particles 116 upon intercalation of particle ions, such as lithium ions, into inclusions 122.

The elastomer binder material 118 preferably includes a main polymeric component and a cross-linking/accelerating agent. The main polymeric component is preferably a non-fluorinated elastomer polymer having non-conjugated double bonds. Specifically, what is meant by the term non-conjugated is non-alternating double and single bonds. For example, and as shown below, 1,3-Butadiene is conjugated because the double and single bonds alternate. In comparison, 1,4-Pentadiene is non-conjugated because the double and single bonds are non-alternating.

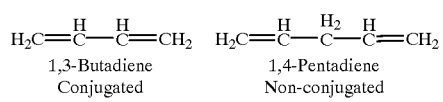

Such main polymeric components may include polymers and copolymers of ethylene, butylene, butadiene, isoprene, styrene-butadiene, styrene-isoprene, siloxane and nitrile rubbers. Commercially available KRATON polymers (D1101, D1116) are especially preferred. While the above-identified main polymeric components have been disclosed, for illustrative purposes only, any one of a number of elastomer polymers are likewise suitable for use—so long as the polymer exhibits a maximum elasticity greater than the volumetric variation of the multi-component particles 116.

The second binder component is a cross-linking and/or accelerating agent and is preferably butadiene sulfone (3-sulfolene) which has the following chemical structure:

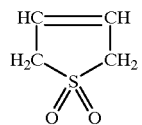

Butadiene sulfone (hereinafter BUSUL) is desirable because it is highly stable at ambient temperature and pressure, inexpensive, odorless, non-flammable and relatively non-toxic. Furthermore, BUSUL is readily soluble in water and many organic solvents. Moreover, BUSUL is manufactured on a large scale by SHELL® as well as many other industrial vendors. Nevertheless any one of a number of cross-linking agents known to those having ordinary skill in the art are likewise contemplated for use.

Figure 5:
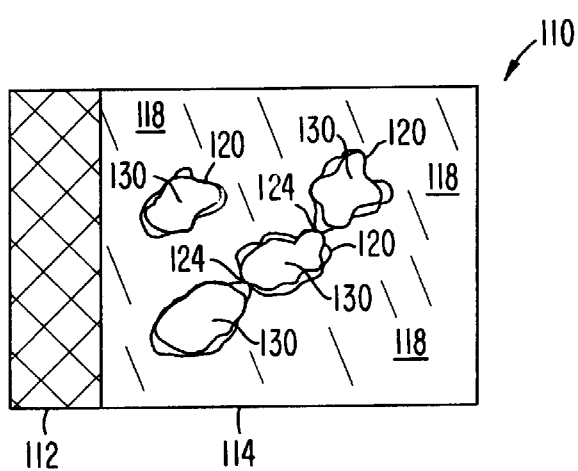
FIG. 5 of the drawings is a schematic representation of an electrode of the present invention after an initial charge.

Electrode 110 is shown in FIG. 5, after an initial charge cycle, as including current collector 112 and electrode layer 114. Electrode layer 114 still comprises a plurality of particles 120 having lithiated inclusions 130 as a result of intercalation of lithium ions therein. However, unlike the prior art, elastomer binder material 118 has not "broken down" or degraded. Indeed, such a phenomenon has occurred because the multi-component particles 116 expand to a volume amount which is less than the maximum amount of what the associated elastomeric binder material 118 can be expanded to without mechanical fatigue and/or degradation. Accordingly, not only is degradation substantially avoided, but the multi-component particles 116 remain in contact with each other, as do inclusions 130 within particles 120.

Figure 6:
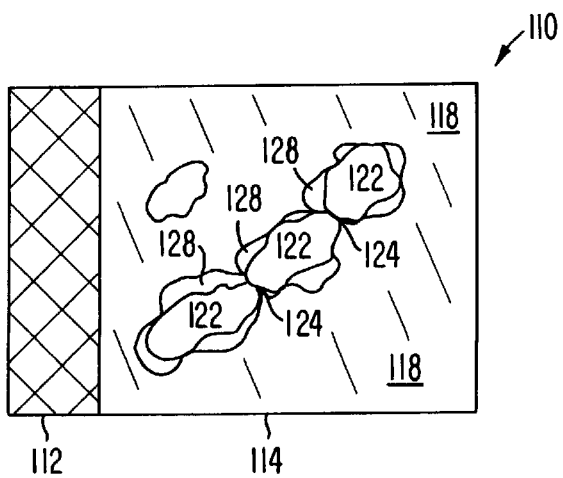
FIG. 6 of the drawings is a schematic representation of an electrode of the present invention after an initial discharge.

Electrode 110 is shown in FIG. 6 after discharge and, in turn, after deintercalation of the lithium ions. As can be seen, even after such deintercalation, the elastomer binder material 118 conforms to the multi-component particles 116—even after a decrease in volume. Accordingly, such components do not pull out of contact with the associated binder material. As a result, electrical conductivity between the components are maintained during cell cycling.

To substantiate the benefits of using an elastomer binder in a lithium ion electrochemical cell as well as disclose the process for fabricating such a cell, several experiments were conducted wherein the following experimental procedure was followed.

First, the main polymeric component was completely dissolved in a suitable organic solvent, such as toluene, in an amount assuring the desired weight ratio of main polymeric component to cross-linking/accelerating agent (See Table 1, Polymer:BUSUL ratio). Second, a conventional anode active material, such as graphite, a metal-oxide, and/or a carbon-metal nanocomposite, was added to the solution in an amount assuring the desired weight ratio of anode active material to binder (See table 1, AM:Binder ratio). Third, the paste like mixture was homogenized using a ceramic mortar and pestle. Fourth, the homogenized paste was coated onto a primed (or in some cases non-primed) piece of copper foil. The paste was applied using a draw-down technique (similar to a rolling pin) to assure proper thickness of the electrode and relative smoothness of the electrode surface. Fifth, the coated foil was dried atmospherically for approximately 24 hours and then subsequently placed into an oven having a pre-heated temperature set point of approximately 150 degrees centigrade for approximately 2 hours. Sixth, the cured electrode was further compressed to obtain a desired thickness and amount of void space. Once fabricated, the electrode electrical conductivity was measured using a four probe method.

The characterization results of the electrodes fabricated with an elastomer binder as described above are summarized in Table 1.

TABLE 1

| Polymer | Type | AM: BINDER (wt. ratio) | Polymer: BUSUL (wt. ratio) | Surface Resistance ($\Omega/cm^2$) | Mechanical Properties |
|---------|------|------------------------|----------------------------|------------------------------------|-----------------------|
| SB (D1101) | Linear | 90:10 | 100:0 | $6.04 \times 10^8$ | good |
| SB (D1101) | Linear | 90:10 | 90:10 | $1.64 \times 10^4$ | good |
| SB (D1101) | Linear | 93:7 | 100:0 | $5.26 \times 10^4$ | good |
| SB (D1101) | Linear | 93:7 | 95:5 | $9.65 \times 10^3$ | good |
| SB (D1116) | Branched | 93:7 | 100:0 | $1.72 \times 10^4$ | good |
| SB (D1116) | Branched | 93:7 | 95:5 | $1.08 \times 10^3$ | very good |

SB-styrene butadiene copolymer
(D1101,D1116)-Commercially Availably from SHELL ®

As can be seen, the electrodes fabricated with an elastomer binder having BUSUL were characterized as having a substantially lower surface resistivity than the electrodes fabricated without the BUSUL. Specifically, in each of the experiments the electrode fabricated with BUSUL had a smaller surface resistivity by an order of one magnitude. It is well known that such a decrease in surface resistivity will directly increase the conductivity within the electrochemical cell. Additionally, each of the electrodes that were fabricated using BUSUL maintained good to very good mechanical properties. These properties include workability as well as lack of curling.

While the use of BUSUL is desirous, it should be noted that the present invention is by no means limited thereto. Indeed, it is the use of an elastomeric binder in association with the above described particles which is novel.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. An electrode for use in an electrochemical cell comprising:
   a current collecting substrate;
   an electrode active material cluster having at least one particle wherein the particle includes at least one inclusion; and
   an elastomer binder surrounding at least a portion of the at least one particle, wherein the elastomer binder comprises a main polymeric component and a cross linking agent comprising butadiene sulfone.

2. The electrode according to claim 1 wherein the at least one particle comprises a volumetric variation which is less than the maximum elasticity of the associated elastomer binder.

3. The electrode according to claim 1 wherein the main polymeric component comprises a non-fluorinated compound having non-conjugated double bonds.

4. The electrode according to claim 1 wherein the main polymeric component is selected from at least one of the group of polymers and copolymers of ethylene, butylene, butadiene, isoprene, styrene, chloroprene, siloxane, and nitrile rubbers.

5. The electrode according to claim 1 wherein the main polymeric component is a styrene-butadiene-styrene block copolymer.

6. The electrode according to claim 1 wherein the concentration of the butadiene sulfone ranges from about 1 wt. % to about 10 wt. % of the overall elastomer binder.

7. An electrode for use in an electrochemical cell comprising:
  a current collecting substrate;
  an electrode active material cluster having at least one particle wherein the particle includes at least one inclusion; and
  an elastomer binder surrounding at least a portion of the at least one particle, wherein the elastomer binder is formed by curing a main polymeric component and a cross linking agent comprising butadiene sulfone.

8. An electrochemical cell comprising:
  an electrolyte;
  a first electrode and a second electrode wherein at least one of the first and second electrodes comprises:
    a current collecting substrate;
    an electrode active material cluster having at least one particle wherein the particle includes at least one inclusion; and
    an elastomer binder surrounding at least a portion of the at least one particle, wherein the elastomer binder comprises a main polymeric component and a cross linking agent comprising butadiene sulfone.

9. The electrochemical cell according to claim 8 wherein the at least one particle comprises a volumetric variation which is less than the maximum elasticity of the associated elastomer binder.

10. The electrochemical cell according to claim 8 wherein the main polymeric component comprises a non-fluorinated compound having non-conjugated double bonds.

11. The electrochemical cell according to claim 8 wherein the main polymeric component is selected from at least one of the group of polymers and copolymers of ethylene, butylene, butadiene, isoprene, styrene, chloroprene, siloxane, and nitrile rubbers.

12. The electrochemical cell according to claim 8 wherein the main polymeric component is a styrene-butadiene-styrene block copolymer.

13. The electrochemical cell according to claim 8 wherein the concentration of the butadiene sulfone ranges from about 1 wt. % to about 10 wt. % of the overall elastomer binder.

14. An electrochemical cell comprising:
  an electrolyte;
  a first electrode and a second electrode wherein at least one of the first and second electrodes comprises:
    a current collecting substrate;
    an electrode active material cluster having at least one particle wherein the particle includes at least one inclusion; and
    an elastomer binder surrounding at least a portion of the at least one particle, wherein the elastomer binder is formed by curing a main polymeric component and a cross linking agent comprising butadiene sulfone.

15. An electrochemical process associated with an electrochemical cell comprising the steps of:
  applying an electrical charge to an electrochemical cell having an anode, a cathode, and an electrolyte wherein the anode includes an active material cluster having particles with at least one inclusion and an elastomer binder surrounding at least a portion of each of the particles, wherein the elastomer binder comprises a main polymeric component and a cross linking agent comprising butadiene sulfone;
  each of the particles has at least a portion in contact with the associated elastomer binder, and each of the particles being conductively associated with another particle;
  intercalating metal ions into the inclusions within the associated particles; and
  maintaining continuity between the elastomer binder and the associated particles during and after the step of intercalating.

16. The electrochemical process according to claim 15 further including the steps of:
  deintercalating the previously intercalated ions out of the inclusions; and
  maintaining continuity between the elastomer binder and the associated particles during and after the step of deintercalating.

* * * * *

UNITED STATES PATENT AND TRADEMARK OFFICE
CERTIFICATE OF CORRECTION

PATENT NO. : 6,225,003 B1
DATED : May 1, 2001
INVENTOR(S) : Krawiec et al.

It is certified that error appears in the above-identified patent and that said Letters Patent is hereby corrected as shown below:

Column 2,
Line 64, delete "clastomer" and insert instead -- elastomer --.

Signed and Sealed this

Twentieth Day of November, 2001

Attest:

*Nicholas P. Godici*

*Attesting Officer*

NICHOLAS P. GODICI
*Acting Director of the United States Patent and Trademark Office*